(12) United States Patent
Lai et al.

(10) Patent No.: US 7,886,104 B2
(45) Date of Patent: Feb. 8, 2011

(54) DETACHABLE ADAPTER AND PORTABLE SYSTEM

(75) Inventors: Yu-Peng Lai, Taoyuan (TW); Chih-Hung Li, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 21 days.

(21) Appl. No.: 12/467,237

(22) Filed: May 15, 2009

(65) Prior Publication Data

US 2010/0077121 A1  Mar. 25, 2010

(30) Foreign Application Priority Data

Sep. 25, 2008  (TW) ............................... 97136980 A (51) Int. Cl.
*G06F 13/00* (2006.01)

(52) U.S. Cl. ...................... 710/301; 710/305; 713/324

(58) Field of Classification Search ......... 710/301–306, 710/100; 713/300–340

See application file for complete search history.

(56) References Cited

U.S. PATENT DOCUMENTS

2009/0210734 A1 * 8/2009 Schramm et al. ............. 713/324
2009/0249090 A1 * 10/2009 Schmitz et al. ............. 713/300

* cited by examiner

*Primary Examiner*—Khanh Dang
*Assistant Examiner*—Kim T Huynh
(74) *Attorney, Agent, or Firm*—Rabin & Berdo, P.C.

(57) ABSTRACT

A detachable adapter is provided for being detachably connected to a data bus of a receptacle of a portable device to form a portable system. The adapter includes a conversion circuit and can inform the portable device that whether a power source is available and inform the portable device of connection status of the adapter through the data bus. The portable device can be connected to the power source through one of the receptacles of the adapter so that the portable device is powered or charged, and the portable device can be connected to at least one client device through the other receptacle of the adapter simultaneously.

20 Claims, 5 Drawing Sheets

DETACHABLE ADAPTER AND PORTABLE SYSTEM

This application claims the benefit of Taiwan application Serial No. 97136980, filed Sep. 25, 2008, the subject matter of which is incorporated herein by reference.

BACKGROUND OF THE INVENTION

1. Field of the Invention

The invention relates to a portable device and an adapter for connecting a power adapter to a peripheral apparatus and a method thereof, and more particularly to a method and a portable device of simultaneously powering and connecting a client device through a data bus, and a detachable adapter thereof.

2. Description of the Related Art

At present, the manufacturer's design of the portable device tends to be developed toward the miniaturization to satisfy the user's demands on the appearance and the portability. The required interface port of the portable device to be connected to other external devices is designed as simple as possible. The conventional method is to design a single port (i.e., a receptacle) on the portable device to satisfy various requirements for other external devices. For example, a mobile phone, a digital camera or a digital personal assistant is usually provided with a receptacle satisfying a single interface specification. The AC adapter, any other electronic device or a computer host can be connected to the receptacle through a plug of the cable with the same interface specification. The receptacle may satisfy the universal standard, such as the universal serial bus (USB) standard so that the design of the receptacle can be simplified.

However, the use of the universal standard also has drawbacks. For example, when the portable device serves as the host under the USB standard, the portable device serving as the host must provide the power source to the client device to enable the client device to operate when the host and the client device are connected to each other and the data is transmitted between the host and the client device. In this case, even if the external charger or AC adapter can supply the power source, it still cannot be connected to the portable device together with the client device to power the portable device. On the contrary, when the portable device is connected to the external charger, it cannot be connected to the client device and the data cannot be transmitted between the portable device and the client device. Thus, the usage of the portable device is restricted, and the portable device and the external power source are not effectively used so that the user may feel inconvenient.

SUMMARY OF THE INVENTION

The invention is directed to a portable device, which can be connected to a power source for powering and connected to a client device simultaneously through a data bus of a receptacle, and a detachable adapter and a method thereof. The embodiment of the invention provides a detachable adapter, which is detachably connected to a data bus of a receptacle of a portable device, and can inform the portable device that whether an external power source is available and inform the portable device of the connection status of the adapter through the data bus. The portable device can be connected to a power source for powering through one of the receptacles of the adapter, and can be connected to at least one client device through the other receptacles of the adapter. Thus, the portable device can charge its battery using this power source, and data can be transmitted between the portable device and the client device. In addition, the power source may further be supplied to the client device at the same time.

According to a first aspect of the present invention, a detachable adapter is provided so that a portable device can be simultaneously connected to a power source for powering and connected to a client device through a data bus of a receptacle. The adapter includes a first receptacle, a second receptacle, a plug, and a conversion circuit. The first receptacle is detachably coupled to a first data bus of a first electronic device. The second receptacle is detachably coupled to a second data bus of a second electronic device. The plug is detachably coupled to the host data bus of the receptacle of portable device and for providing a set of host bus signals on the host data bus of the portable device. The set of host bus signals includes a data signal, a connection status signal, and a power signal. The first receptacle is coupled to the plug so that at least a data signal line and a power signal line of the first data bus of the first electronic device are respectively coupled to at least a data signal line and a power signal line of the host data bus. The conversion circuit is coupled to the second data bus of the second receptacle and for determining whether the second electronic device is connected to the second receptacle according to at least a signal obtained from the second data bus, and providing the connection status signal on the plug so that the portable device obtains connection status of the adapter. If the conversion circuit determines that the second electronic device is connected to the second receptacle, the conversion circuit outputs a power signal obtained from the second data bus to the plug to serve as the power signal of the host bus signals, and outputs the power signal to the first receptacle to serve as a power signal of the first data bus.

According to a second aspect of the present invention, a portable system is provided. The portable system includes a portable device and an adapter. The portable device includes a bus controller, a receptacle, a connection status detection circuit, and a microprocessor. The bus controller provides and controls a host data bus. The receptacle couples the host data bus to an external device. The connection status detection circuit is coupled to the receptacle and for determining external coupling status of the host data bus and generating an event signal. The microprocessor controls the portable device, wherein the microprocessor performs power control in response to the event signal. The adapter is detachably connected to the host data bus of the receptacle of the portable device. The adapter includes a first receptacle, a second receptacle, a plug, and a conversion circuit. The first receptacle is detachably coupled to a first data bus of a client device. The second receptacle is detachably coupled to a second data bus of a power supply device. The plug is detachably coupled to the host data bus of the receptacle of the portable device and for providing a set of host bus signals on the host data bus of the portable device. The set of host bus signals includes a data signal, a connection status signal and a power signal, and at least one signal line of the first data bus of the first receptacle is coupled to the host data bus of the plug to serve as at least the data signal of the set of host bus signals. The conversion circuit is coupled to the second receptacle and for providing the set of host bus signals on the plug according to at least one signal obtained from the second data bus, and determining whether the power supply device is connected to the second receptacle according to the at least one signal obtained from the second data bus, and providing the connection status signal on the plug so that the portable device obtains connection status of the adapter. If the conversion circuit determines that the power supply device is connected to the second receptacle, the conversion circuit outputs a power signal, obtained from the second data bus, to the plug to serve as the power signal of the host bus signals, and outputs the power signal to the first receptacle to serve as a power signal of the first data bus. The connection status detection circuit of the portable device receives the connection status signal to generate the event signal. When the connection status signal indicates a first connection status for representing that the adapter is connected to the portable device and the power supply device, the microprocessor of the portable device, according to the event signal, determines whether to power or charge the portable device by the power signal of the host bus signals.

The invention will become apparent from the following detailed description of the preferred but non-limiting embodiments. The following description is made with reference to the accompanying drawings.

DETAILED DESCRIPTION OF THE INVENTION

Figure 1:
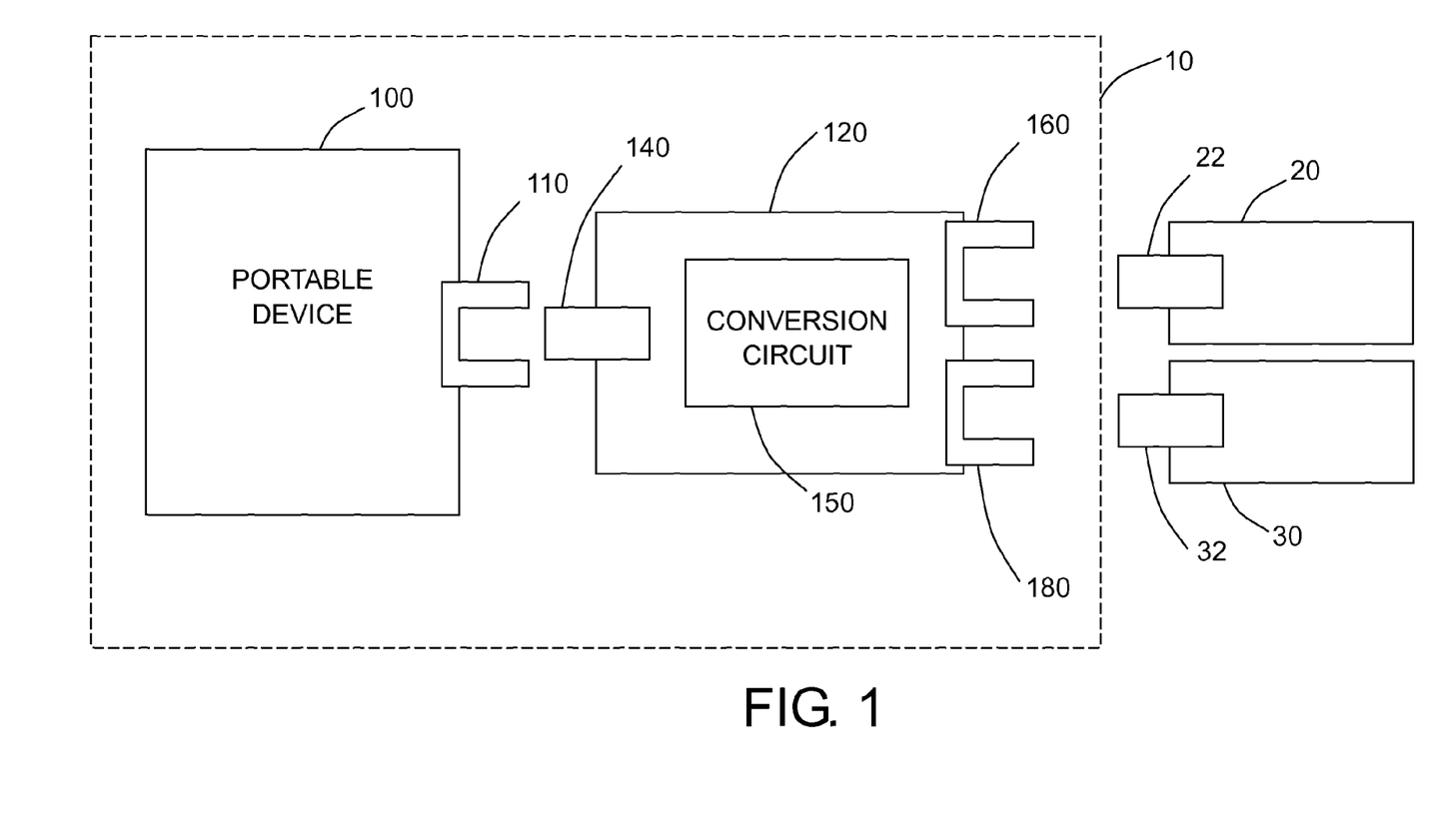
FIG. 1 is a schematic block diagram showing a portable system according to an embodiment of the invention, wherein a portable device and a detachable adapter are used.

FIG. 1 is a schematic block diagram showing a portable system 10 according to an embodiment of the invention, wherein a portable device and a detachable adapter are used. Referring to FIG. 1, the portable system 10 includes a portable device 100 and a detachable adapter (may considered as host accessory) 120. The portable device 100 is an electronic device with an embedded system, and the electronic device may be, for example, a mobile phone, a personal digital assistant, a multimedia player or an electronic dictionary, and is usually powered by a battery or even has a built-in charger, which may selectively charge the battery when receiving the external power source. The portable device 100 has a receptacle 110 with a host data bus, such as universal serial bus (USB), satisfying some electric or data bus specification so that it can be connected to a first electronic device or a second electronic device to transmit data therebetween or to be powered or charged by the power supply device. The first electronic device may be an external client device 20 shown in FIG. 1, and the second electronic device may be a power supply device, such as a power adapter 30 shown in FIG. 1. However, the portable device 100 cannot be simultaneously connected to the client device 20 and the power adapter 30 through the receptacle 110, so the data cannot be transmitted therebetween and they cannot be powered, simultaneously.

When an external client device has to be used and the portable device 100 has to be powered or charged by a power supply device simultaneously, the receptacle 110 of the portable device 100 is connected to a plug 140 of the adapter 120.

Thus, the client device 20 and the power adapter 30 may be respectively connected to a first receptacle 160 and a second receptacle 180 through the adapter 120, so that they can be simultaneously coupled to the portable device 100. Furthermore, the adapter 120 includes a conversion circuit 150 for detecting whether the client device coupled to the data bus for the second receptacle 180 is a power supply device. If so, the adapter 120 combines the data signal, obtained from a plug 22 of the client device 20, with the power signal, obtained from a plug 32 of the power adapter 30, and provides a set of data bus signals (not shown) on the host data bus through the plug 140. The set of data bus signals includes a connection status signal (not shown) for representing the connection status of the adapter 120 with many states. Thus, the portable device 100 can obtain the current connection status of the adapter 120 according to the connection status signal. If the connection status represents that the adapter 120 has been connected to a power supply device, the portable device 100 itself can determine whether it has to be powered or charged from the outside. On the other hand, the portable device 100 may simultaneously use the data bus of the client device 20 and enable various functions of the client device 20. Furthermore, the power source of the power supply device can further be simultaneously supplied to the client device 20. Consequently, when the user is operating the portable device 100, the power source provided by the battery of the portable device 100 can only dedicated for the portable device 100 while the power source for driving the client device 20 may be provided by the power supply device. In addition, when the battery power of the portable device 100 is insufficient and the battery has to be charged, the power supply device may timely charge the portable device 100. In other words, the portable device 100 can power and operate the client device 20 simultaneously through a data bus.

The adapter 120 may be implemented in a cradle or a docking station adapted to the portable device 100, or may be embedded into a cable.

In the following, other embodiments of the portable device 100 and the adapter 120 will be illustrated with respect to the embodiment of the portable system 10.

Figure 2:
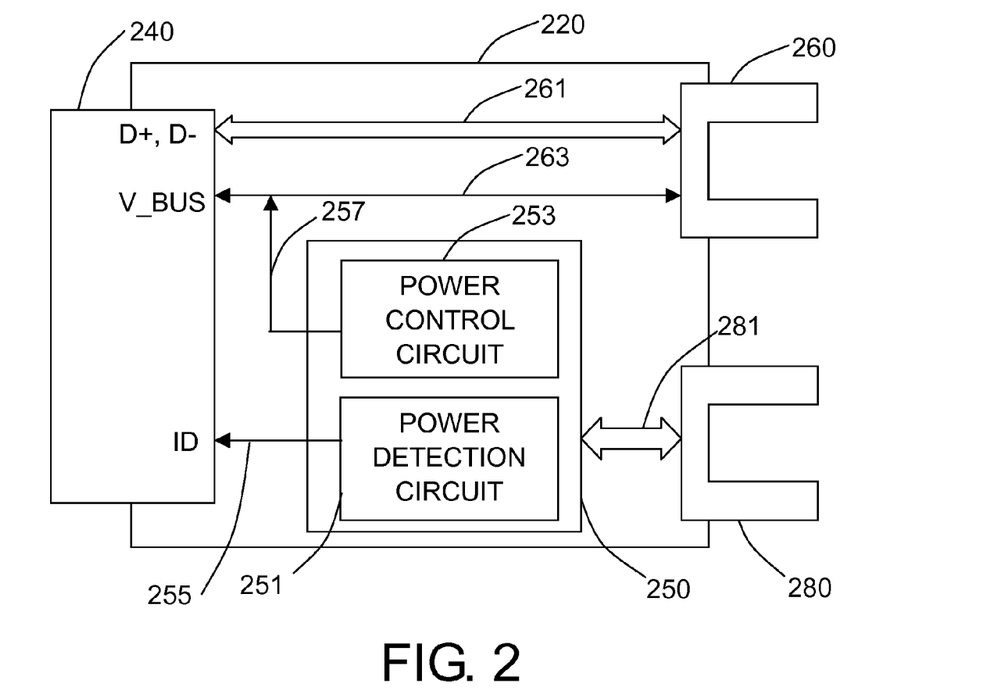
FIG. 2 shows the detachable adapter according to the embodiment of the invention.

Referring to FIG. 2, an adapter 220 according to the embodiment of the invention includes a plug 240, a first receptacle 260, a second receptacle 280 and a conversion circuit 250. The plug 240 is detachably coupled to the host data bus of the receptacle 110 of the portable device 100, and provides a set of host bus signals on the host data bus of the portable device 100. The set of host bus signals includes at least one data signal, a connection status signal, and a power signal. The first receptacle 260 is detachably coupled to a first data bus of a client device. The second receptacle 280 is detachably coupled to a second data bus of a power supply device. One or more signal lines of the first data bus of the first receptacle 260, for example, a data signal set 261, are coupled to the host bus of the plug to provide data signal on the host bus signal. In addition, the USB and its extended standard (e.g., USB On-the-Go, hereinafter referred to as USB OTG) will be taken as examples in the following embodiments, for the sake of illustration. The host data bus of the receptacle 110 is a USB, and the signals transmitted thereon include: the data signal set 261, such as D+ and D− signals defined by the USB; the power signal 263, such as a V_BUS signal defined by the USB; and a connection status signal 255.

Moreover, the conversion circuit 250 is coupled to a second data bus 281 of the second receptacle 280 and thus provides the connection status signal 255 and determines whether to output a power signal, obtained from the second data bus, to the plug 240.

The conversion circuit 250 determines whether a power supply device is connected to the second receptacle according to the signal obtained from the second data bus, and provides the connection status signal 255 on the plug 240 so that the portable system 10 obtains the connection status of the adapter 220. The conversion circuit 250 includes, for example, a power detection circuit 251 for providing the connection status signal 255. As mentioned above, this embodiment employs the ID signal defined by the extended specification of USB (USB OTG) to implement the connection status signal 255. It is noted that, in the OTG, the ID signal originally is defined to be either grounded or left floating inside the plug to represent the status that the plug is connected to a default host or a default peripheral. In contrast, a plurality of connection states are defined in this embodiment. For example, the ID signal is set to a first voltage, such as ½ VDD, to represent the status where the adapter 220 is connected to the portable device 100 and connected to a power supply device.

If the conversion circuit 250 determines that a power supply device is connected to the second receptacle 280, the adapter 220 outputs a power signal, obtained from the second data bus, to the plug 240 to serve as the power signal of the host bus signal (i.e., the V_BUS signal of the plug 240), and outputs the power signal to the first receptacle to serve as a power signal of the first data bus. Consequently, the conversion circuit 250 includes, for example, a power control circuit 253. The power control circuit 253 outputs a power signal 257 to the transmission line that is for transmitting the power signal 263 and is coupled to the plug 240 and the first receptacle 260. The power control circuit 253 buffers and outputs the power signal, obtained from the second data bus, to the plug 240. In addition, the power control circuit 253 may be regarded as a buffer, which includes, for example, a power switch for buffering and outputting.

In addition, the power detection circuit 251 and the power control circuit 253 may operate in different manners. In one example, the power detection circuit 251 and the power control circuit 253 may operate independently. In another example, the power detection circuit 251 outputs a control signal to the power control circuit 253 in a first connection state. The power control circuit 253, in response to the control signal, outputs a power signal, obtained from the second data bus, to serve as the power signal of the host bus signal and the power signal of the first data bus.

In addition, the power detection circuit 251 may be implemented in different ways in practice to make determination for a power signal and generate the connection status signal. However, when the adapter 220 is being implemented, the adapter 220 has to be configured to support at least one known power supply device or to determine the output format of the power supply device, so as to determine whether a power supply device is connected to the second receptacle according to the signal obtained from the second data bus. For example, the universal power adapter in China outputs the DC power through the VBUS signal of the USB format, and the data signal set (e.g., signals D+ and D−) is short-circuited for the sake of identification. In Taiwan, however, the ID signal of the plug of the typical power adapter satisfying the output format of the USB mini or USB micro plug is grounded. In addition, other types of design may also be obtained. According to this knowledge, the power detection circuit 251 can be implemented using logic circuitry or circuit elements (e.g., a comparator).

Figure 3:
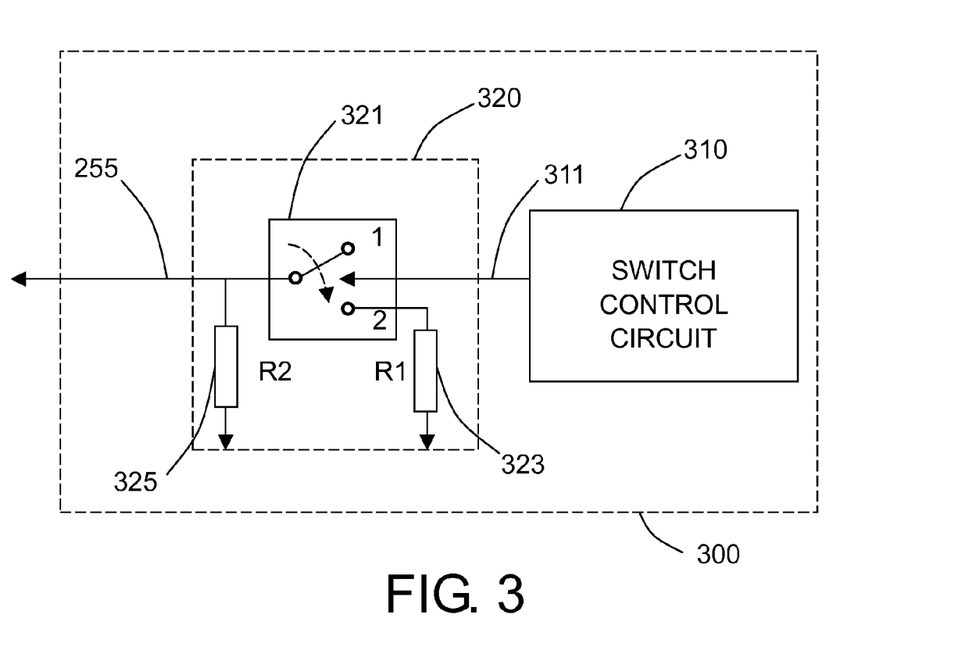
FIG. 3 shows a power detection circuit of the detachable adapter according to the embodiment of the invention.

FIG. 3 shows a power detection circuit 300 according to the embodiment of the invention. Referring to FIG. 3, the power detection circuit 300 includes a switch control circuit 310 and a switch circuit 320. The switch control circuit 310 determines whether a power supply device is connected to the second receptacle 280 according to the signal obtained from the second data bus, and thus generates a switch control signal 311, wherein the switch control signal 311 corresponds to one of a plurality of connection states. When the host data bus of the receptacle 110 of the portable device 100 is coupled to the plug 240, the switch circuit 320 is coupled to the host data bus, the switch circuit 320 changes the status in response to the switch control signal 311, and provides the connection status signal 255 onto the host data bus to inform the portable device 100 of the connection status of the adapter. The switch circuit 320 has one of a plurality of resistance values selectively according to the connection status represented by the switch control signal 311. For example, when a power adapter 30 is connected to the second receptacle 280, if the switch control circuit 310 determines, as mentioned above, that the data signal set (D+ and D−), obtained from the second data bus 281, is short-circuited, or that its ID signal is grounded, the switch control signal 311 is outputted to control an analog switch 321 of the switch circuit 320 to switch from state 1 to state 2. That is, when the second receptacle 280 is not connected to a power supply device, the resistance value of the switch circuit 320 is R2; when the second receptacle 280 is connected to a power supply device, the resistors of the switch circuit 320 are connected in parallel, and the resistance value is changed to R1∥R2; and if R1 and R2 are equal to 200 Ohms, the resistance value is changed from 200 Ohms to 100 Ohms. When the connection status signal line in the host data bus of the receptacle 110 of the portable device 100 is connected to a voltage dividing circuit, the connection status signal 255 on the connection status signal line is set to a corresponding voltage level according to whether the second receptacle 280 is connected or not.

As for the connection status, an example is taken below in which four states are defined to indicate the states when the portable device 100 is connected to the adapter 120 or a general host cable for connecting to the host. In a first state, the receptacle 110 of the portable device 100 is not connected to the adapter 120, and the connection status signal on the connection status signal line is defined to be about a voltage value VDD. In a second state, the receptacle 110 of the portable device 100 is only connected to the adapter 120, and the connection status signal may be defined to be about a voltage of ⅔ VDD. In a third state, if the adapter 120 is connected to the portable device 100 and a power supply device (e.g., the power adapter 30), the connection status signal may be defined to be about a voltage of ½ VDD. In a fourth state, the portable device 100 supports the situation that the adapter 120 is not used and a host cable (not shown) is directly inserted into the portable device 100; that is, the ID signal defined by the USB OTG is grounded (e.g., equal to 0). The above definitions of the connection status signals are made for the purpose of illustration only. One of ordinary skill in the art may extend, redefine or change the definitions according to various requirements to associate the other voltage values with different statuses. The implementation of the switch circuit 320 is not restricted to the examples mentioned hereinabove, and the switch circuit 320 may also be implemented by a circuit capable of representing different states by signals in different format.

Figure 4:
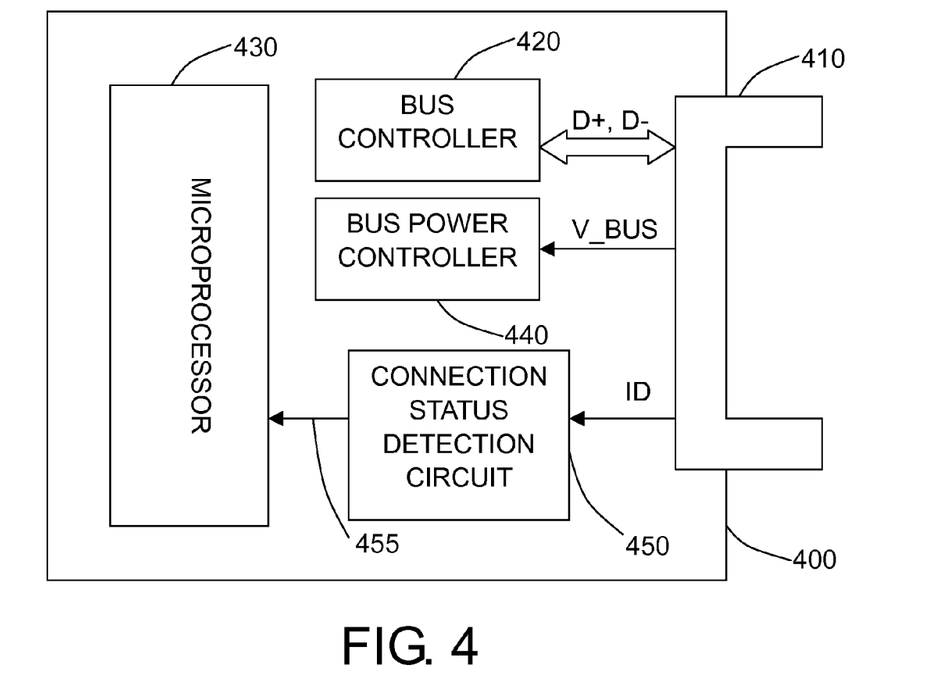
FIG. 4 shows the portable device according to the embodiment of the invention.

In response to different statuses of the connection status signal 255, the portable device 100 has to perform the detection to determine how to adjust the power control. Referring to FIG. 4, a portable device 400 according to the embodiment of the invention includes a receptacle 410, a bus controller 420, a microprocessor 430 and a connection status detection circuit 450. The microprocessor 430 provides and controls a host data bus, which includes, for example, a first data signal line and a second data signal line, such as the D+ and D− signal lines of the USB. The receptacle 410 couples the host data bus to an external device. The connection status detection circuit 450, coupled to the receptacle 410, determines external coupling status of the host data bus, and thus generates an event signal 455. The microprocessor 430 may be used to control the portable device 400, wherein the microprocessor 430 performs the power control in response to the event signal 455. The connection status detection circuit 450 receives the connection status signal 255 to generate the event signal 455. If the connection status signal 255 corresponds to a connection state to represent that the adapter is connected to the portable device 400 and a power supply device, the microprocessor 430 of the portable device 400, in response to the event signal 455, determines whether the power signal of the host bus signal of the portable device 400, such as the VBUS signal is used to power or charge the portable device 400. In addition, the portable device 400 may further include a bus power controller 440 for receiving the VBUS signal.

Figure 5:
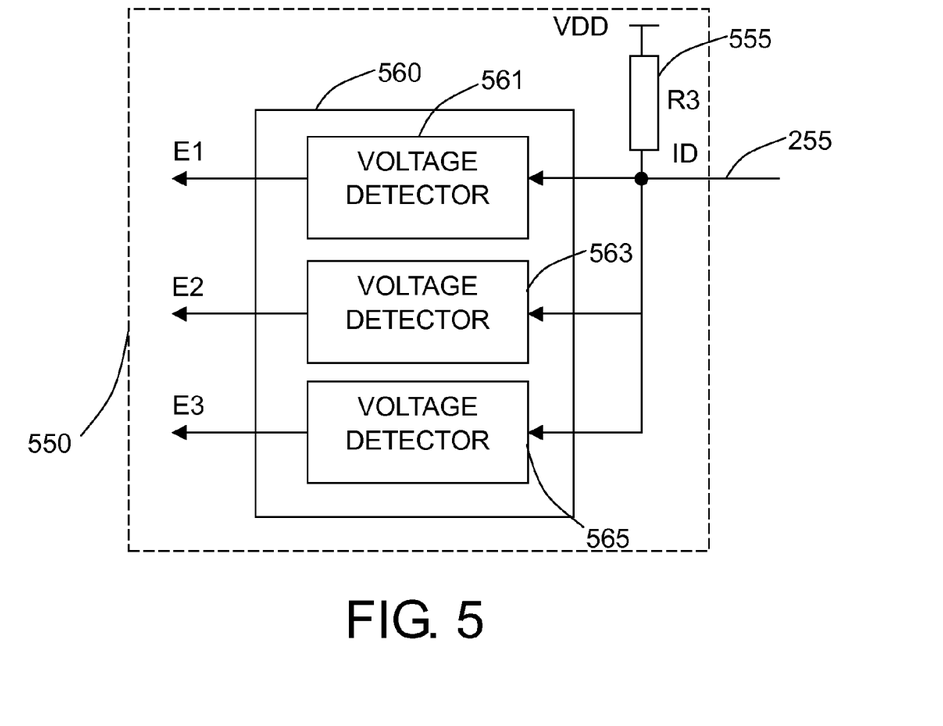
FIG. 5 shows a connection status detection circuit of the portable device according to the embodiment of the invention.

Referring to an embodiment of a connection status detection circuit 550 in FIG. 5 and the power detection circuit 300 in FIG. 3, the operation of the portable device 400 connected to the adapter 220 is illustrated. The connection status detection circuit 550 includes a voltage detection unit 560, which includes three voltage detectors 561, 563 and 565 for respectively detecting three voltage values, such as ⅔ VDD, ½ VDD and 0, as defined in the above example of the definition of the connection status signal 255 of the connection status signal line. In addition, in order to satisfy the definition of the above-mentioned example, the connection status detection circuit 550 further includes a resistor having the resistance value R3, which is 100 Ohms. In this example, when three voltage detectors of the voltage detection unit 560 detect the above-mentioned voltages, they respectively generate events E1, E2 and E3 to represent an event signal 455, which may be implemented by interruption, for example. After receiving the event signal 455, the microprocessor 430 can adjust the power control according to different connection states. The power control may be, for example, the operation of receiving the externally supplied power or charging the battery.

Figure 6:
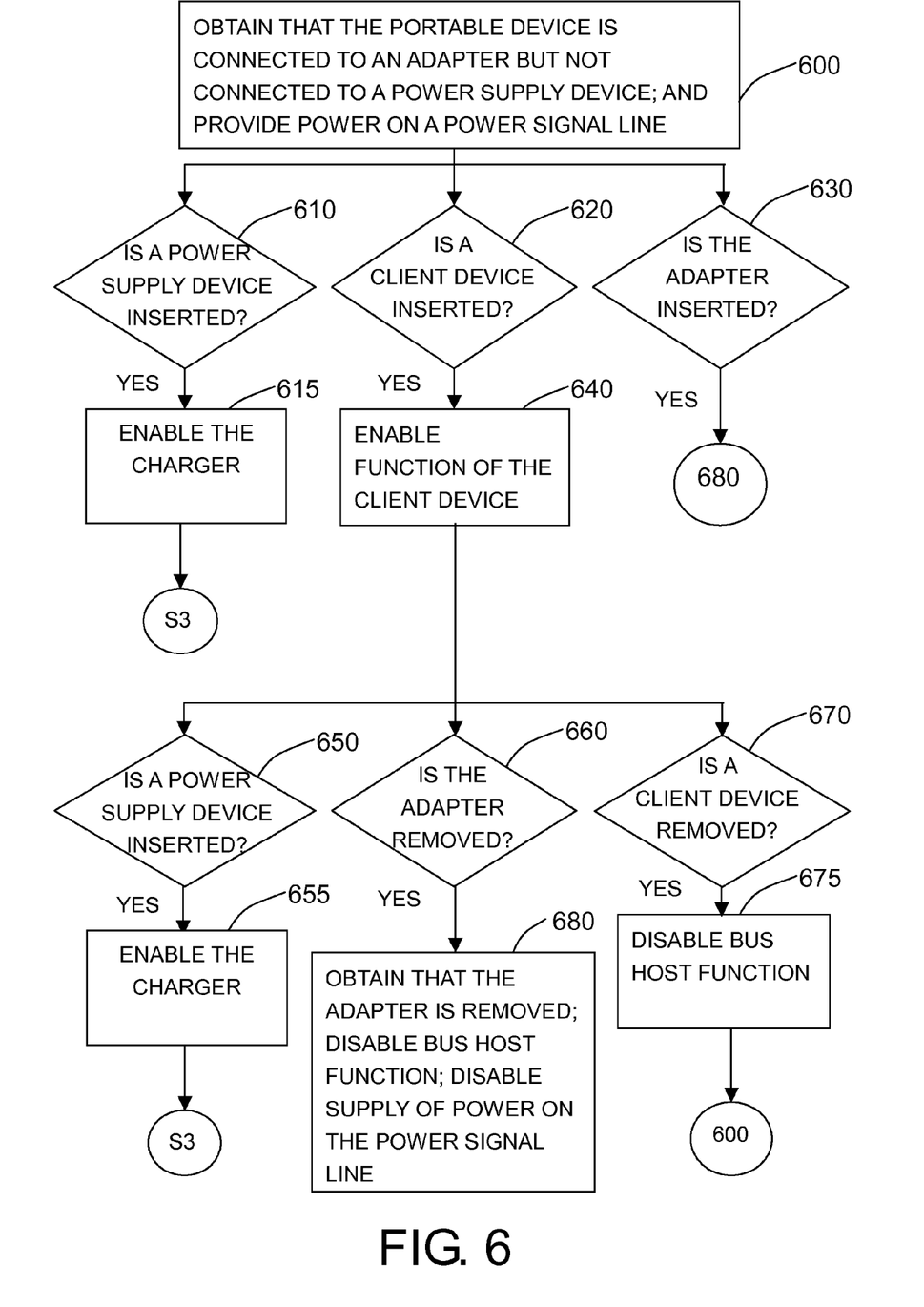
FIG. 6 is a flow chart showing how the power control is adjusted in a second status of the portable device according to the embodiment of the invention.

FIG. 6 is a flow chart showing how the microprocessor 430 adjusts the power control when the event signal 455 represents the second status of the above-mentioned example, according to the embodiment of the invention. First, block 600 represents that the portable device 400 is in the second status, as indicated by S2, and the portable device is informed that the adapter 120 has been connected, but a power supply device or a client device is not connected. The portable device provides the power source, such as 5V for the USB, to the power signal line. As shown in block 610, when the variation of the event signal 455 (e.g., the signal level of the interrupt signal for the event E1 is decreased from the high level to the low level) represents that a power supply device is inserted into the adapter 120, the charger is enabled or the external power source is received, and the third status (hereinafter referred to as S3) is entered, as shown in block 615. As shown in block 620, when it is detected that a client device is inserted into the adapter 120, the client device function is enabled, as shown in the block 640. Thereafter, the process proceeds to perform different operations in response to other situations, such as that shown in block 650, 660 or 670. When it is determined that the adapter 120 has been removed, as shown in block 630 or 660 (e.g., the interrupt signal for the event E1 is changed from the low level to the high level), the microprocessor 430 is informed that the adapter has been removed, and disables the bus host function and the supplied power on the power signal line, as shown in block 680, and the first status is processed. As shown in block 650, if it is determined that the power supply device is inserted into the adapter 120, the charger is enabled or the external power source is received, as shown in block 655, and the third status (hereinafter referred to as S3) is entered. As shown in block 670, if it is determined that the client device is removed, the bus host function is disabled, as shown in block 675.

Figure 7:
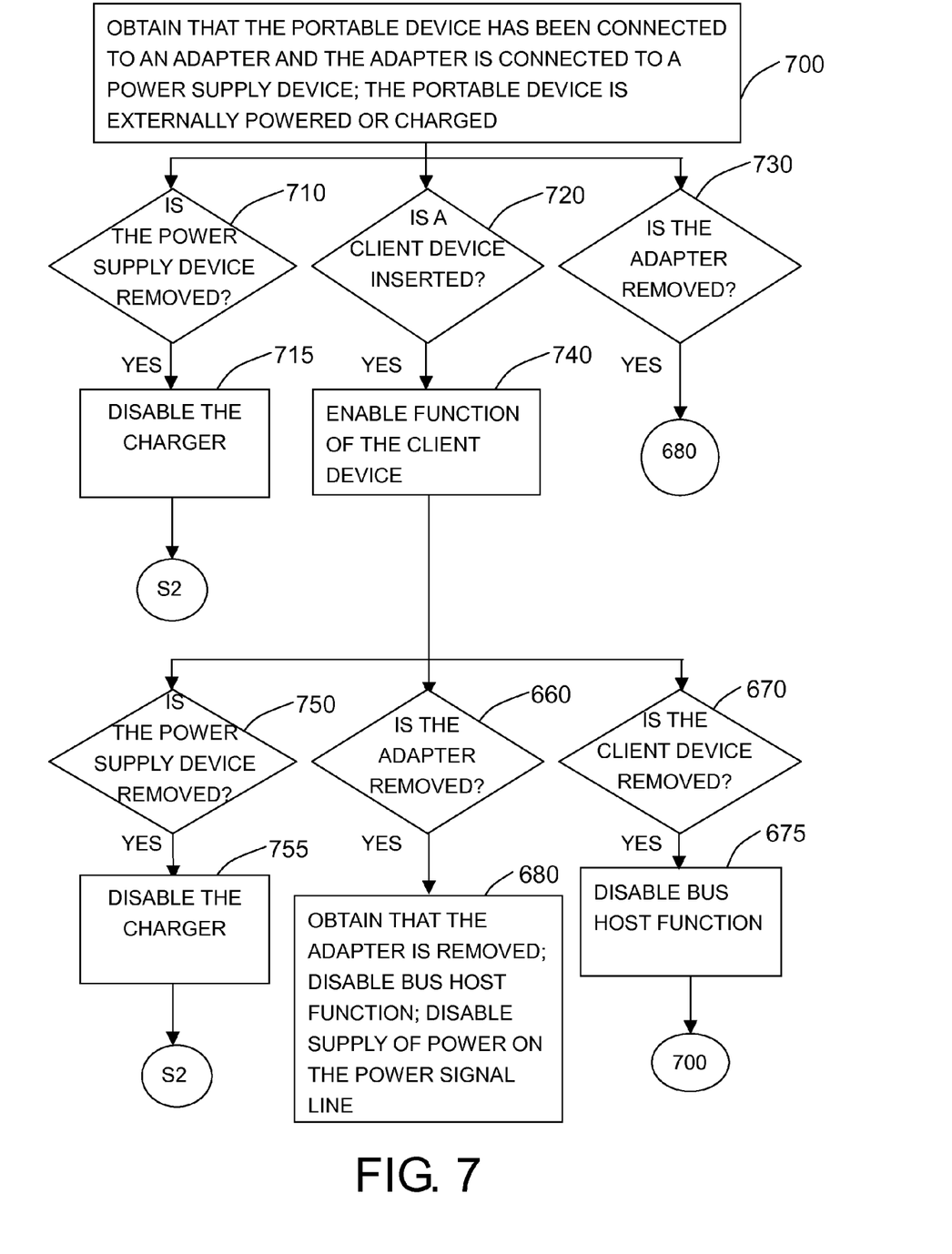
FIG. 7 is a flow chart showing how the power control is adjusted in a third status of the portable device according to the embodiment of the invention.

FIG. 7 is a flow chart showing how the microprocessor 430 adjusts the power control when the event signal 455 represents the third status of the above-mentioned example, according to the embodiment of the invention. First, block 700 represents that the portable device 400 is in the third status. That is, the portable device has been connected to the adapter, and the adapter is connected to a power supply device, and the portable device is externally powered or charged. As shown in block 710, when the variation of the event signal 455 represents that the power supply device is removed from the adapter 120, the charger is disabled or the external power source is not received so that the portable device 400 is self-powered and the second status (hereinafter referred to as S2) is entered, as shown in block 715. As shown in block 720, when it is detected that a client device is inserted into the adapter 120, the client device function is enabled, as shown in block 740. Thereafter, the process proceeds to perform different operations in response to other situations, as shown in block 750, 660 or 670. When it is determined that the adapter 120 is removed, as shown in block 730 or 660, the process is performed, as shown in block 680, wherein the first status is processed. As shown in block 750, if it is determined that the power supply device is removed from the adapter 120 after the client device is enabled, the charger is disabled or the external power source is no longer received so that the portable device is self-powered, as shown in block 755, and the second status is entered.

According to the disclosed embodiment of the invention, a detachable adapter is detachably connected to a data bus of a receptacle of a portable device. The portable device can be connected to a power source through one of the receptacles of the adapter and is thus powered, and can be connected to at least one client device through other receptacles of the adapter. Thus, the portable device can charge the battery with this power source and can be connected to the client device for data transmission at the same time. In addition, the power source may further power the client device. Therefore, the convenience of use is enhanced and the use of the external power source is optimized.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detachable adapter, for being detachably connected to a host data bus of a receptacle of a portable device, the adapter comprising:
    a first receptacle, detachably coupled to a first data bus of a first electronic device;
    a second receptacle, detachably coupled to a second data bus of a second electronic device;
    a plug, detachably coupled to the host data bus of the receptacle of portable device, for providing a set of host bus signals on the host data bus of the portable device, wherein the set of host bus signals comprises a data signal, a connection status signal, and a power signal, and the first receptacle is coupled to the plug so that at least a data signal line and a power signal line of the first data bus of the first electronic device are respectively coupled to at least a data signal line and a power signal line of the host data bus; and a conversion circuit, coupled to the second data bus of the second receptacle, for determining whether the second electronic device is connected to the second receptacle according to at least a signal obtained from the second data bus, and providing the connection status signal on the plug so that the portable device obtains connection status of the adapter, wherein if the conversion circuit determines that the second electronic device is connected to the second receptacle, the conversion circuit outputs a power signal obtained from the second data bus to the plug to serve as the power signal of the host bus signals, and outputs the power signal to the first receptacle to serve as a power signal of the first data bus.

2. The detachable adapter according to claim 1, wherein the connection status signal corresponds to one of a plurality of connection states, and the connection states comprise:

a first connection state for representing that the adapter is coupled to the portable device and coupled to a power supply device, wherein the first electronic device comprises a client device, and the second electronic device comprises the power supply device.

3. The detachable adapter according to claim 2, wherein the host data bus is a universal serial bus (USB), and the connection status signal of the set of host bus signals is an ID signal of the USB.

4. The detachable adapter according to claim 2, wherein when the connection status signal indicates the first connection state, the portable device determines whether the portable device is powered or charged by the power signal of the host bus signals.

5. The detachable adapter according to claim 1, wherein the conversion circuit comprises:

a power detection circuit for determining whether a power supply device is connected to the second receptacle according to the at least one signal obtained from the second data bus, and for providing the connection status signal on the plug so that the portable device obtains the connection status of the adapter; and a power control circuit for outputting a power signal obtained from the second data bus to the plug to serve as the power signal of the host bus signals, and outputting the power signal to the first receptacle to serve as the power signal of the first data bus.

6. The detachable adapter according to claim 5, wherein:

the power detection circuit outputs a control signal if the power detection circuit determines that the power supply device is connected to the second receptacle;

the power control circuit, in response to the control signal, outputs a power signal obtained from the second data bus to the plug to serve as the power signal of the host bus signals, and outputs the power signal to the first receptacle to serve as the power signal of the first data bus.

7. The detachable adapter according to claim 5, wherein the power control circuit comprises a power switch for buffering and outputting the power signal obtained from the second data bus to the plug.

8. The detachable adapter according to claim 5, wherein the power detection circuit comprises:

a switch control circuit for determining whether the power supply device is connected to the second receptacle according to the at least one signal obtained from the second data bus, and accordingly generating a switch control signal corresponding to one of a plurality of connection states; and a switch circuit, wherein when the host data bus of the receptacle of the portable device is coupled to the plug, the switch circuit is coupled to the host data bus, the switch circuit provides the connection status signal to the host data bus in response to the switch control signal and informs the portable device of the connection status of the adapter.

9. The detachable adapter according to claim 8, wherein the switch circuit has one of a plurality of resistance values selectively according to the connection status represented by the switch control signal.

10. The detachable adapter according to claim 8, wherein the connection status signal has a corresponding voltage level when the connection status signal corresponds to one of the connection states.

11. The detachable adapter according to claim 1, wherein the conversion circuit determines whether a power supply device is connected to the second receptacle according to whether a first data signal and a second data signal that are obtained from the second data bus are short-circuited.

12. The detachable adapter according to claim 1, wherein the conversion circuit determines whether a power supply device is connected to the second receptacle according to whether an ID signal obtained from the second data bus is grounded.

13. The detachable adapter according to claim 1, wherein the conversion circuit determines whether a power supply device is connected to the second receptacle according to a first data signal, a second data signal, an ID signal and a power signal, which are obtained from the second data bus.

14. A portable system, comprising:

a portable device, which comprises:

a bus controller for providing and controlling a host data bus;

a receptacle for coupling the host data bus to an external device;

a connection status detection circuit, coupled to the receptacle of the portable device, for determining external coupling status of the host data bus and generating an event signal; and a microprocessor for controlling the portable device, wherein the microprocessor performs power control in response to the event signal; and an adapter detachably connected to the host data bus of the receptacle of the portable device, wherein the adapter comprises:

a first receptacle, detachably coupled to a first data bus of a client device;

a second receptacle, detachably coupled to a second data bus of a power supply device;

a plug, detachably coupled to the host data bus of the receptacle of the portable device, for providing a set of host bus signals on the host data bus of the portable device, wherein the set of host bus signals comprises a data signal, a connection status signal, and a power signal, and at least one signal line of the first data bus of the first receptacle is coupled to the host data bus of the plug to serve as at least the data signal of the set of host bus signals;

a conversion circuit, coupled to the second receptacle, for providing the set of host bus signals on the plug according to at least a signal obtained from the second data bus, and determining whether the power supply device is connected to the second receptacle according to the at least one signal obtained from the second data bus, and providing the connection status signal on the plug so that the portable device obtains connection status of the adapter, wherein:

if the conversion circuit determines that the power supply device is connected to the second receptacle, the conversion circuit outputs a power signal, obtained from the second data bus, to the plug to serve as the power signal of the host bus signals, and outputs the power signal to the first receptacle to serve as a power signal of the first data bus; and the connection status detection circuit of the portable device receives the connection status signal to generate the event signal, and when the connection status signal indicates a first connection status for representing that the adapter is connected to the portable device and the power supply device, the microprocessor of the portable device, according to the event signal, determines whether to power or charge the portable device by the power signal of the host bus signals.

15. The portable system according to claim 14, wherein the host data bus is a universal serial bus (USB), and the connection status signal of the set of host bus signals is an ID signal of the USB.

16. The portable system according to claim 14, wherein if the bus controller detects that the client device is coupled to the host data bus through the receptacle of the portable device, a function of the client device is enabled.

17. The portable system according to claim 14, wherein if the connection status signal corresponds to the first connection state, the client device is powered by the power signal of the host bus signals.

18. The portable system according to claim 14, wherein if the connection status signal corresponds to a second connection state to represent that the adapter is not connected to the power supply device, the microprocessor of the portable device, according to the event signal, controls the portable device not to be powered or charged by the power signal of the host bus signals.

19. The portable system according to claim 14, wherein the connection status detection circuit comprises a voltage detection unit for determining whether the connection status signal represents the first connection state, and generating the event signal if the connection status signal represents the first connection state.

20. The portable system according to claim 14, wherein the power supply device comprises a power adapter or an AC adapter.

* * * * *